June 11, 1968 R. L. GATES 3,388,020
METHOD AND APPARATUS FOR FINGER-JOINING LUMBER
Filed June 10, 1966 2 Sheets-Sheet 1

INVENTOR.
RICHARD L. GATES
BY Sherman H Bailer
his Attorney

June 11, 1968    R. L. GATES    3,388,020
METHOD AND APPARATUS FOR FINGER-JOINING LUMBER
Filed June 10, 1966    2 Sheets-Sheet 2

INVENTOR.
RICHARD L. GATES
BY Sherman H. Barker
his Attorney

United States Patent Office 3,388,020
Patented June 11, 1968

3,388,020
METHOD AND APPARATUS FOR
FINGER-JOINING LUMBER
Richard L. Gates, Pittsburgh, Pa., assignor to Koppers
Company, Inc., a corporation of Delaware
Filed June 10, 1966, Ser. No. 556,623
10 Claims. (Cl. 156—266)

This invention relates to improved method and apparatus for producing an elongate wood member from a plurality of individual adhesively secured together wood members.

The laminated wood industry has, until recently, used the slope scarf joint as the standard splice for joining together two lengths of lumber. However, the industry now has adopted the finger-type of joint for connecting together two lengths of lumber, because the finger joint conserves lumber and has proved to be structurally equal to the older slope scarf joint. Further, the use of the finger-type joint has resulted in additional advantages since the curing time of a glued finger joint, using high frequency electronic apparatus requires only a fraction of the time to electronically cure a slope scarf joint. Thus, there is a marked increase in the production of glued boards per machine per unit of time. This increase in production has made it necessary to provide faster apparatus for applying the adhesive to the finger joints and for transporting the joined wooden members to the high frequency adhesive curing machine.

Heretofore, it has been customary and necessary to stop the progress of boards through the machinery at least three times. In the first instance the machinery is halted to allow curing to take place in the finger joint; and in the second instance the machiery is halted to allow the cut-off saw to sever a long glued-together board to the proper length. In the third instance, it has been customary to further halt the apparatus in order to bring two boards together so that the finger joint ends are properly indexed before the boards are fed into the electronic adhesive curing machine.

In contrast, the present invention includes apparatus and method to continually index and feed boards to an adhesive curing machine at regular infeed speeds and with no delay in transit.

In accordance with the invention, individual wood members receive an adhesive coating on the finger joints at each end and are continually and successively supported and dropped onto powered feed rolls that advance each individual wood member toward an adhesive curing machine at such a rate of speed that the one individual wood member indexes and makes in a guide or gate zone with a preceding wood member before passing through the adhesive curing machine. In a further aspect of the invention, apparatus is located along an ejection table supporting the elongate wood member, comprising a plurality of such wood members adhesively secured together that contacts the elongate wood member whereupon a cut-off saw severs the elongate wood member and ejects it from the table.

For a further understanding of the present invention and for advantages and features thereof, reference may be made to the following description taken in conjunction with the accompanying drawings which show, for the purpose of exemplification, a preferred embodiment of the invention.

In the drawings:

FIG. 4 is a schematic perspective view of third portion of the apparatus of FIG. 1.

Figure 1:
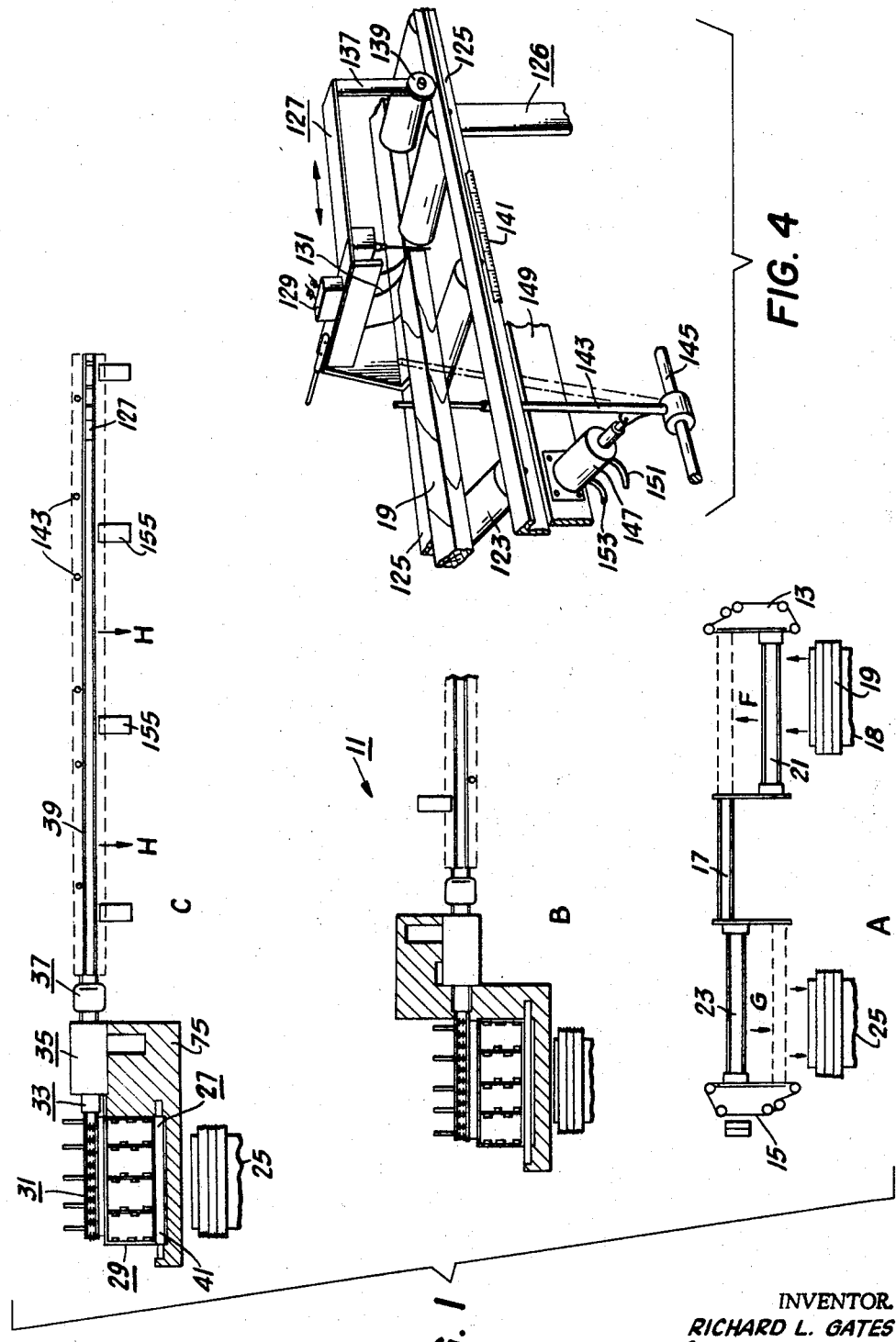
FIG. 1 is a schematic arrangement of apparatus for producing adhesively secured boards incorporating the present invention.

Referring to FIG. 1, the apparatus 11 for producing adhesively secured-together boards comprises three main assemblies A, B, and C.

Assembly A is comprised of a pair of conventional finger joint cutters 13, 15 of the type marketed by Hubel & Platzer, Model No. KSF-N. The units 13, 15 are arranged in spaced apart relation and between units, there is a conventional fixed roller conveyor 17. As shown in FIG. 1, lengths of structural wooden members 19, which may be 2 x 4's, 2 x 6's, etc., are brought to the Hubel & Platzer finger jointer 13 on a suitable wheeled table or dolly 18. A plurality of such structural wood members 19 are disposed on and secured to the conveyor table portion 21 of the finger jointer apparatus 13 and then a machine operator feeds the wooden members in the direction of the arrow F into the machine 13. The finger jointer machine 13 then removes wood from the end portion of each wood member 19 and as the wood passes through the machine cuts the finger-type of joint on the end of each wood member. When the conveyor table portion 21 reaches the position shown in dotted lines in assembly A, the wood members 19 are released from the table portion 21 and they are then placed by a machine operator on the fixed conveyor 17. The movable conveyor table portion 21 then returns to its initial position and another stack of wood members are placed and secured thereon.

The first group of wood members 19 are conveyed to a similar movable conveyor table portion 23 of the unit 15, and they are secured in position for feeding through finger jointer machine 15 in the direction of the arrow G. When the conveyor portion 23 reaches the position shown in dotted lines, the wood members 19 may be removed and placed on another transfer car or dolly 25. At this time, both ends of each wood member 19 have a finger joint end and the stacked units, shown in FIG. 1 at the left, are ready to be moved to the next assembly.

Assembly B and assembly C are identical except that assembly B is a left-hand arrangement and assembly C is a right-hand arrangement, and so, it suffices to describe only one assembly C.

Assembly C comprises an adhesive applicator 27, a transfer table 29, a feed table 31, and guide member 33, a high frequency adhesive curing unit 35, a cut-off saw 37, and an ejection table 39.

Figure 3:
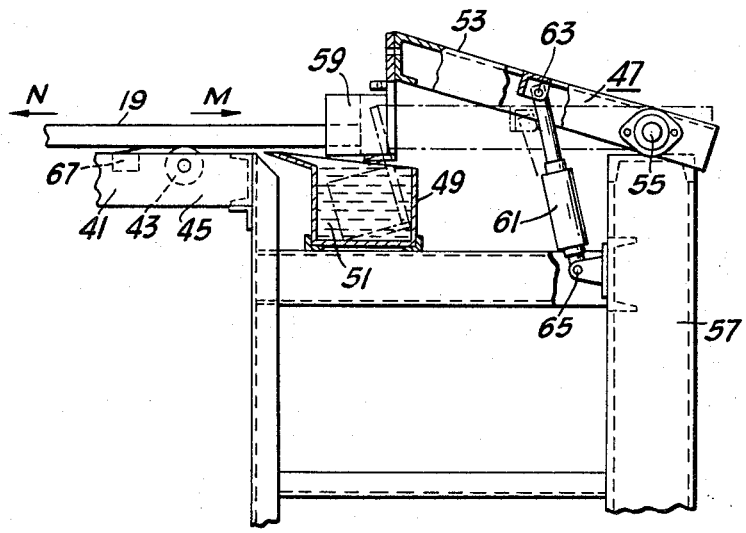
FIG. 3 is a schematic elevational view, partly in section, of a second portion of the apparatus of FIG. 1.

The adhesive applicator 27 comprises a conventional roll case assembly 41 that includes a plurality of rollers 43 supported in a frame structure 45 that are adapted to support a wood member 19 so that it may be moved laterally in both a right- and a left-hand direction, as shown by the arrows M and N of FIG. 3. At each end of the roll case assembly 41, there is located an adhesive applicator 47 (FIG. 3). Each glue applicator comprises a trough or pan 49 in which there is maintained a quantity of adhesive or glue 51, and an arm 53 that is pivotally mounted at 55 to a suitable support 57. The arm 53 carries at its free end an applicator 59 that is shaped complementary to the shape of the finger joint on the end of the wooden member 19. The applicator 59 may be made of any suitable material such as metal, plastic, or wood which has been found to be a more suitable material than any other. The arm 53 is actuated by expansion cylinder 61 pivoted at 63 to the arm 53 and at 65 to the support structure 57.

In operation, the wood members 19 which have previously been processed in the Hubel & Platzer finger joint cutter machines, and which are now ready for joining together as a continuous length of wood, are individually placed on the roll case by a machine operator and the wood member is first moved in the direction of the arrow M until it engages and trips the plate portion of a switch 67 extending slightly above a planar surface tangent of the upper surface of the rollers 43. When the wood member 19 trips the switch 67, an air valve (not shown), admits air under pressure through the expansion cylinder 61, whereupon the arm 53 pivots upwardly and clockwise about the pivot 55 to the position shown by the solid outline in FIG. 3. The wood member 19 then continues toward the applicator 59, and when the finger joint end portion mates with the applicator, the finger joint end portion of the wood member 19 receives a coating of adhesive 51.

Thereafter, the machine operator reverses the direction of motion of the wood member 19; that is, he moves the wood member in the direction of the arrow N, and the opposite finger jointed end portion of the wood member 19 actuates another switch 67 and the wood member 19 engages another applicator 59. As soon as the wood member 19 disengages from the switch plate portions on the right and left-hand sides, the arms 53 return to their normal horizontal positions and the applicators 59 are again emersed in the adhesive 51.

After the wood member 19 has received an application of adhesive to both ends, the machine operator moves the wood member manually onto the transfer table 29. The transfer table 29 (FIG. 2) comprises a plurality of T-shaped rails 69 on which are journalled, preferably on alternate sides of the upright stem portion of the T-rail 69, a plurality of rollers 71. The T-rails are suitably fastened in a spaced apart relation on an I-beam structure 73 that is firmly fixed to the ground or other supporting medium, such as a slightly raised concrete slab 75. Each T-rail 69 terminates adjacent the feed table 31 which is axially disposed at right angles to the parallel axes of the T-rails 69.

The feeder table 31 (FIG. 2) is comprised of a plurality of groups 77 of feed rolls 79 fixedly mounted on a shaft 81, shaft 81 being suitably journaled in bearings 83 that are mounted on a supporting structure 85. Each of the roller groups 77 are mounted in spaced relation, and the feed rolls 79 of each group are mounted on the shaft 81 in spaced apart relation. At least one group of feed rolls 77, or all of the feed rolls 77 in a particular application, is powered by a combined electric motor and reduction gear 84, a V-belt 86 engaging pulleys 88 mounted on the motor drive shaft and the extending end of the shaft 81. The speed of the powered feed roll group or groups 77 may be varied, and it is preferred that the speed be about three times the speed of the advancing rolls in the apparatus 35.

Intermediate adjacent roller groups 77, there are pairs of abutments 87, 89 that may be adjustably positioned so that the longitudinal vertical axial plane of the feeder table 31 bisects the space between abutments 87, 89. Each abutment 87, 89 is individually movable so that lumber of various widths may be centrally accommodated between the abutments. It should be understood that each opposed pair of abutments 87, 89 may, if preferred, be moved simultaneously in any suitable manner, such as by a common single shaft having thereon right- and left-hand screws. The abutment 87 is provided with a recess (not shown) in the end facing the opposite abutment 89 to receive the tapered end portion of a support rod 91 that is reciprocable in a sleeve 93 mounted on the opposite side of the abutment face 89. The support rod 91 is an extension of a piston rod 95 extending from an expansion cylinder 97 that is conveniently mounted on a support frame 99. The abutment 89 may be maintained in selected positions on the support frame 99 by inserting locating pins 101 in matching holes 103 in the support frame 99.

In a similar manner, the opposite abutment 87 is mounted on a shaft 105 that is slidable in a fixed bushing 107 suitably mounted to a support frame 109. In like manner, the abutment 89 may be located in selected positions by inserting a pin 111 in matching holes in the shaft 105.

Figure 2:
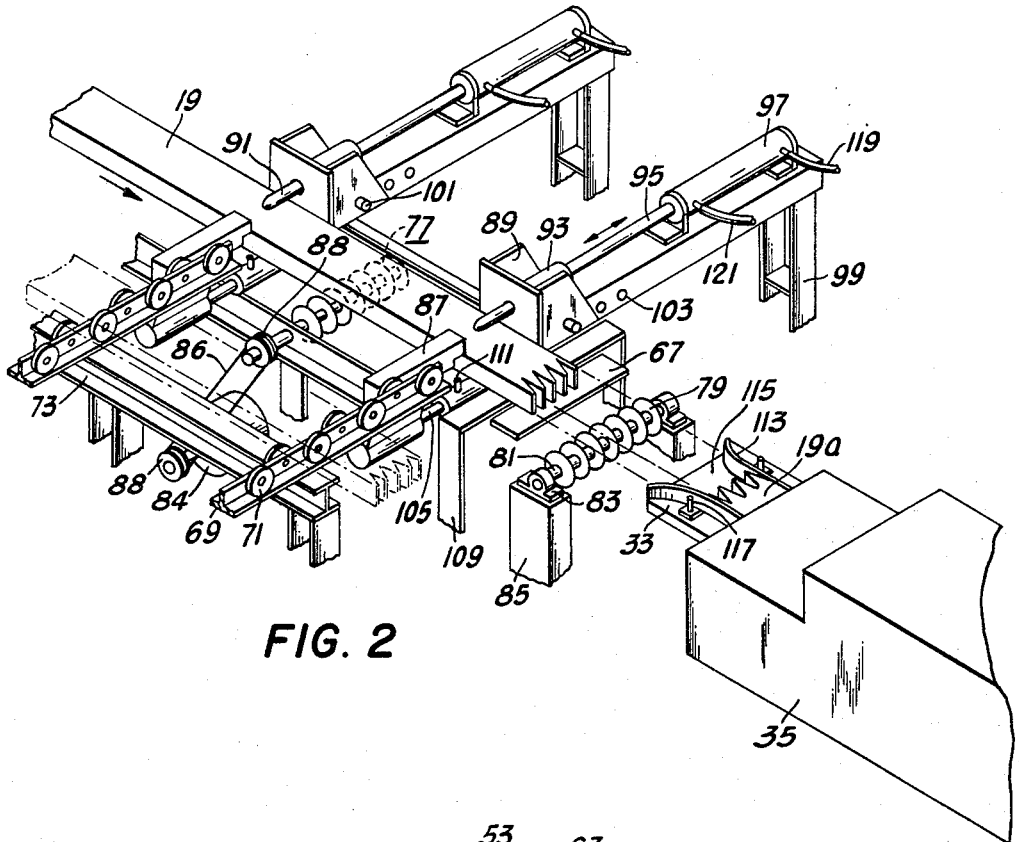
FIG. 2 is a schematic perspective view of a first portion of the apparatus of FIG. 1.

When the wood member 19 arrives at the end of the T-rails 69, it is then moved onto the support rods 91 that are normally in the extended position shown in FIG. 2. The abutments 87, 89 are positioned in spaced apart relation to receive the particular size of wood member 19 that is being handled. In the embodiment of the invention shown in FIG. 2, another wood member 19a has already advanced into and partially through the adjustable gate or guide 33 that is axially aligned with the feed rolls 79 and with the advancing rolls and heating platens (not shown) in the high frequency adhesive curing apparatus 35.

The guide or gate 33 is, like the abutments 87, 89, laterally adjustable to accommodate a particular size wood member being handled. The sides 113 of the gate 33 may be fixed to a base plate 115 by means of locating pins 117, or in any other suitable manner.

Between the roller group 77 nearest the gate 33 and the first pair of abutments 89, there is another switch plate portion of a switch 67 that operates to actuate a valve (not shown) that controls the admission of air through hoses 119, 121 to the expansion cylinder 97.

When the wood member 19 is supported on the roller groups 77 and engages the switch plate 67, air is admitted to the expansion cylinder 97 through hose 119 and the support rod 95 is urged and maintained in the extended position shown in FIG. 2. In such extended position, the rods 91 support the next wood member moving from the T-rails 69 toward the feed table 31, and such wood member 19 is maintained in abutting relation against the vertical face of the abutment 89, and in an over-axial aligned relation with the feed rolls 77. When the trailing edge of the wood member 19a disengages from the switch plate 67, air is admitted into the expansion cylinder 97 through hose 121 and out of the expansion cylinder through hose 119 whereupon the support rods 91 are then retracted into the bushing 93. Immediately, the wood member 19 gravitates onto the feed rolls 77 and engages the switch plate 67, the support rods 91 become extended and engage with the opposite abutment 87. These support rods 91 are now able again to support the next succeeding wood member 19.

The roller groups 77 are, in a particular application, driven by conventional power means such as the combination electric motor and reduction gear 84, and chain or V-belt drive 86. The roller groups 77, as mentioned previously, are operated at about three times the speed of movement of the wood member 19a into and through th ecuring unit 35, so that, when the wood member 19 gravitates onto the power feed roller groups 77, it is propelled toward the gate or guide 33 and catches up and mates in the gate or guide 33 with the trailing edge of the wood member 19a. From the gate location, the mated members 19, 19a move into engagement with the feeding rolls of the curing unit 35.

The final mating and curing of the adhesive is done within the unit 35. A suitable type of high frequency adhesive curing apparatus is that manufactured and marketed by Mann-Russell Electronics, of Tacoma, Wash. From the adhesive curing apparatus 35, the joined-together wood members move along the ejection table 39.

The ejection table 39 comprises a plurality of rollers 123 (FIG. 4) that are journalled in longitudinally extending parallel spaced apart angles 125 forming the upper members of a structural support frame 126 that is firmly supported on the ground or other base structure The longitudinally extending angle frame structure may be any convenient length and generally is somewhat longer than the length of the longest adhesively secured wood member that is to be made.

Adjacent the outer end of the angle frame structure, that is at the right in FIG. 1 assembly C, there is a movable frame 127 on which is mounted a microswitch 129 having three spring-like wands 131 depending therefrom. The wand frame 127 is adjustably positionable along the angle frame 125 from a remote location, such as an operator's control console in the vicinity of the curing unit 35. The operator may position the wand support frame in any selected location by a suitable hand wheel and meter (not shown). The other side of the support structure 127 is supported by a leg 137 carrying a roller 139 that rolls on the opposite angle 125. Then, the operator may position the frame 127 along the length of the angle frame structure at a location where the wands are opposite a scale or indicia 141, showing the length of the adhesively secured-together wood member as measured from the cut-off saw 37, when the extended wood member engages one or more of the wands 131, the cut-off saw is activated and the wood advancing mechanism within the unit 35 is stopped allowing the saw 37 to cut the member to the selected length.

At various spaced apart locations along the length of the ejection table 39, there are ejector rods 143 (FIG. 4) that are pivotally mounted on a support rod 145 located and fixed at a convenient level near the ground or floor support and below the angles 125. The ejector rod 143 is preferably made in a telescoping manner and the members may be adjusted relative to each other so that the upper member engages the elongate wood member supported by the rollers 123. That is to say, the length of the ejector rod may be varied to suit the thickness of the wood member 19 being handled.

At a convenient level above the pivot rod 145, the ejector rod 143 is pivoted to a cylinder-piston arrangement 147 that is fixed to a suitable support bar 149. The cylinder-piston arrangement 147 is also provided with air hoses 151, 153 leading to opposite ends of the cylinder portion so that the cylinder-piston arrangement can pivot the jector rod 143 about the pivot rod 145.

In a particular application, when a continuous length of adhesively secured together wood members 19 engage and deflect at least one of the depending wands 131, the mechanism advancing the continuous wood member is halted and the cut-off saw 37, which operates continually, pivots upward and severs the wood member 19. After the wood member 19 is cut, the saw blade pivots downwardly again and at the same time, air is admitted into the cylinder-piston 147 through the hose 153 and the ejector rod 143 pivots about the rod 145 against the wood member 19 and urges it horizontally in the direction of the arows H (FIG. 1–C). The ejected wood member 19 is then received by a plurality of spaced apart wheeled dollies 155 or other suitable receiving apparatus. During the time it takes to cut off the wood member and eject it from the table, the forward progress of the wooden member 19 is stopped and the forward progress resumes only after the saw has pivoted downward and out of the path of the wood member emerging from the adhesive curing apparatus 35.

A plurality of adhesively secured together wood members of the same length accumulate on the dollies 155, and when a sufficient number of them have accumulated, they may be moved into another position to receive further treatment that may include planing and gluing into a desired structural shape.

A feature of the present invention is that the wooden members 19 and 19a are properly indexed and joined together at regular infeed speeds when they arrive at the guide or gate 33. It is not necessary to further stop the infeed cycle to index the wooden members before advancing them into the adhesive curing machine. Thus, considerable cumulative time is saved in a production period by using apparatus or the present invention.

Although the invention has been described herein with a certain degree of particularity, it is understood that the present disclosure is made only as an example and that various modifications and changes may be made within the scope of the invention as defined by the appended claims.

What is claimed is:
1. Apparatus for producing an elongate wood member from a plurality of individual wood members, comprising:
  (a) apparatus for forming finger joints on the ends of said wood members;
  (b) apparatus for applying adhesive to said finger jointed ends;
  (c) first means for moving such wood members successively to;
  (d) a feed table including driven feed rolls adapted to receive and linearly advance successive individual wood members at a first rate of speed;
  (e) means for engaging and advancing individual wood members along an axis of advancement into an adhesive curing machine at a second rate of speed that is less than said first rate of speed;
  (f) second means for supporting and maintaining successively other individual wood members one at a time in vertical alignment with and above the linear axis of advancement of said wood members on said feed rolls;
  (g) an adjustable gate disposed intermediate said curing machine and said feed rolls that is in axial alignment with the path of linear advancement of said individual wood members;
  (h) switch means responsive to the presence of wood member on said feed rolls disposed intermediate said gate and said feed rolls for actuating said supporting second means whereby when the trailing end of a first individual wood member advancing through said curing machine at the second rate of speed disengages from said switch means, said supporting second means is removed and said second wood member gravitates onto said feed rolls and advances linearly toward said gate wherein the opposed adhesive coated finger jointed ends of said first and second wood members index and mate, said second individual wood member engaging said switch means and thereby restoring said second means to a position of support for a third and successive individual wood members in cycle;
  (i) an ejector table disposed in juxtaposed relation to said adhesive curing machine and in opposed axial relation to said feed rolls for receiving and supporting the continuous length of wood emerging from said curing machine comprised of a plurality of said finger jointed wood members secured together;
  (j) a powered pivotal cut-off saw disposed intermediate said ejector table and said adhesive curing machine;
  (k) means on said ejector table actuatable in response to contact with said continuous length of wood to halt the advancement of said wood and pivot said cut-off saw whereby said continuous length of wood is severed;
  (l) means to return said cut-off saw to an initial position;
  (m) means to eject said severed length of wood from said ejector table including a plurality of spaced apart rods each pivotally mounted to said ejector table for movement in respective planes normal to the longitudinal axis of said severed elongate length of wood; and
  (n) means for pivoting said rods in unison to engage and eject said severed length of wood from said table.
2. The invention of claim 1 wherein said supporting second means includes:
  (a) spaced apart expansion cylinders mounted adjacent said feed rolls each such cylinder having a piston rod extendable generally perpendicular to and vertically above the axis of advancement of said feed rolls, said rods when extended being adapted to sup- port an individual wood member and retractable when the trailing end of a wood member disengages from said switch means; and
(b) spaced apart first abutments variably positionable in relation to said feed rolls so that an individual wood member supported by said rods and engaging said abutments is in vertical axial alignment with the axis of advancement of said feed rolls.

3. The invention of claim 2 including:
(a) spaced apart second abutments variably positionable in relation to said feed rolls and in opposed relation to said first abutments, the distance between opposed abutments being generally the width of an individual wood member.

4. The invention of claim 1 wherein said supporting second means includes:
(a) a plurality of spaced apart opposed pairs of abutments each such pair of opposed abutments being variably positionable on opposite sides of the axis of advancement of said feed rolls a distance apart substantially equal to the width of a particular individual wood member, one said abutment having therein an aperture; and
(b) spaced apart expansion cylinders mounted adjacent said pierced abutments each having a piston rod extending through said aperture and engageable with the opposite abutment to support an individual wood member between said opposed abutments while another wood member engages said switch means, and retractable when no wood member engages said switch means whereby the other wood member falls onto said feed rolls, engages said switch means and causes said rods to extend again.

5. The invention of claim 1 wherein the means actuatable in response to contact with said continuous length of wood includes:
(a) a frame positionable on the ejector table at various selected positions relative to said cut-off saw; and
(b) a wand suspended from said frame in the path of said continuous elongate wood member whereby when said wood member deflects said wand the advancement of said wood member halts and said saw pivots to engage and sever said wood member.

6. The invention of claim 1 wherein:
(a) said gate has variably positionable sides adapted to be equally spaced from and on opposite sides of the axis of advancement toward said adhesive curing machine a distance substantially equal to the width of an individual wood member.

7. The method for producing an elongate wood member from a plurality of individual wood members comprising the steps:
(a) forming finger joints on the ends of each said wood members;
(b) applying adhesive to each said finger jointed end portion;
(c) advancing successively such wood members to a feed table including powered feed rolls adapted to receive individual wood members;
(d) supporting and maintaining a first individual wood member in alignment with and vertically above the linear axis of advancement of said feed rolls;
(e) releasing said supported first individual wood member whereby the same falls onto said feed rolls and the same wood member is advanced linearly toward an adhesive curing machine;
(f) supporting and maintaining a second wood member in alignment with and vertically above the linear axis of advancement of said feed rolls;
(g) releasing said supported second individual wood member whereby the same falls onto said feed rolls and is advanced toward the trailing edge of said first wood member, the finger jointed end portions of said first and second members indexing and mating;
(h) advancing both said first and mated second wood members into a machine adapted to cure the adhesive in the mated finger joint;
(i) halting the advancement of said first and second mated members in said machine;
(j) curing the mated finger joint between said first and second members;
(k) advancing the formed elongate wood member while a third wood member falls onto said feed rolls, advances toward, indexes and mates with the trailing finger jointed end of said elongate wood member;
(l) repeating the aforesaid cycle of events to produce an elongate wood member comprised of a plurality of finger jointed wood members adhesively secured together.

8. The invention of claim 7 including:
(a) supporting said elongate formed wood member on an ejector table;
(b) providing a contact variably positionable along said table that engages the advancing end of said elongate wood member and actuates a cut-off saw for
(c) severing the elongate wood member; and
(d) ejecting the severed portion of said elongate wood member from said table.

9. The invention of claim 8 wherein the step of ejecting the severed portion comprises:
(a) pivoting in unison a plurality of spaced apart vertical rods that are pivotably connected at one end and engaging the wood member at the other end, in respective planes perpendicular to the linear axis of advancement of said elongate wood member.

10. In the method for producing an elongate wood member from a plurality of individual wood members, the improvement cycle of steps comprising:
(a) forming finger joints in the ends of said wood members;
(b) applying adhesive to each said finger joint end;
(c) feeding first and second indexed and matched finger joint ended wood members into an adhesive curing machine while
(d) supporting a third individual wood member in position for indexing and matching with the trailing end of said second wood member;
(e) halting said first and second wood members in said curing machine while the adhesive in the joint therebetween is cured;
(f) advancing the joined together first and second wood members away from said adhesive curing machine;
(g) releasing said supported third wood member from the support and
(h) advancing the same into indexing and matching relation with the trailing finger jointed end of said elongate wood member before the joined together wood members enter said adhesive curing machine; and
(i) repeating the cycle of steps including halting, curing, indexing and matching of ends to produce an elongate wood member of desired length.

References Cited

UNITED STATES PATENTS

| | | | |
|---|---|---|---|
| 2,300,728 | 11/1942 | Goss | 156—304 |
| 3,126,308 | 3/1964 | Brockerman et al. | 156—304 |

FOREIGN PATENTS 705,387   3/1965   Canada.

EARL M. BERGERT, *Primary Examiner.*

W. E. HOAG, *Assistant Examiner.*